United States Patent [19]
Griffith et al.

[11] 3,914,774
[45] Oct. 21, 1975

[54] PHOTO MACHINE WITH ROD AND RACK GUIDED CARRIAGE

[75] Inventors: Louis E. Griffith, Hampstead, N.H.; Peter R. Ebner, Lowell, Mass.

[73] Assignee: Graphic Systems, Inc., Hudson, N.H.

[22] Filed: May 31, 1974

[21] Appl. No.: 475,115

[52] U.S. Cl. .................................... 354/5; 354/17
[51] Int. Cl.² ........................................ B41B 13/00
[58] Field of Search ........................... 354/5, 7, 18

[56] References Cited
UNITED STATES PATENTS
3,116,661   1/1964   Holland ........................... 354/7

*Primary Examiner*—John M. Horan
*Attorney, Agent, or Firm*—Alfred H. Rosen; Frank A. Steinhilper

[57] ABSTRACT

A photo machine such as a photo typesetter employs a guided carriage to carry an optical output device in a line-by-line scan along a photo recording member. The machine includes a moveable character store such as a rotating drum carrying a type font, and means to flash expose selected characters and to project the image to the input of an optical train. The optical output is mounted on a carriage positioned to slide along a single track or rail and to be propelled and guided by a single drive device including a pinion engaging a geared rack and force loading means to maintain such engagement. Precise positioning and precise motion control are achieved. The carriage control is adapted for a scanning optical output and a photo composing machine is illustrated as one embodiment of the invention.

2 Claims, 6 Drawing Figures

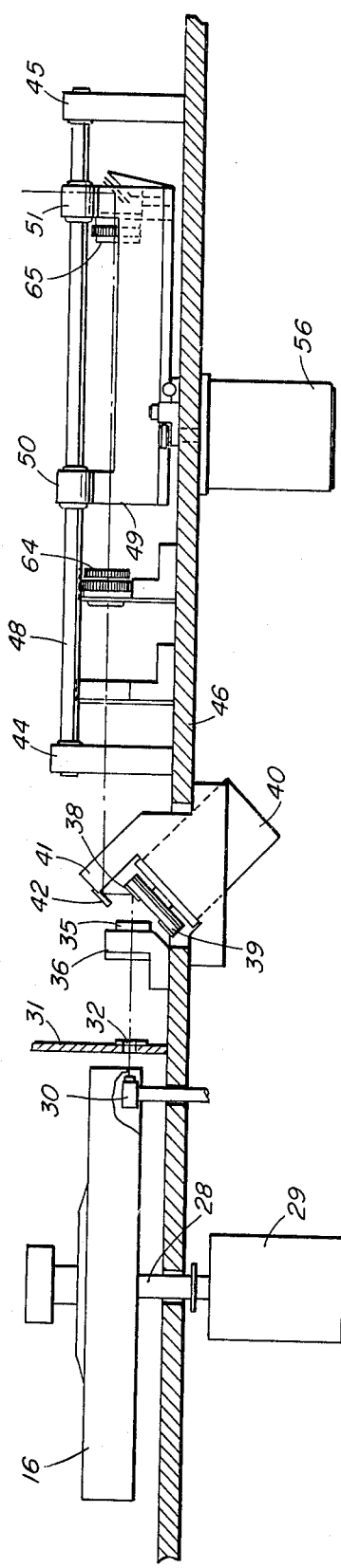
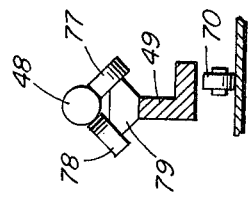
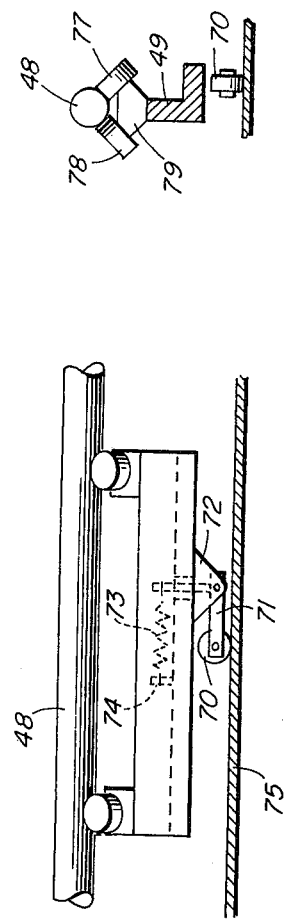
*FIG. 2*
*FIG. 6*
*FIG. 5*

PHOTO MACHINE WITH ROD AND RACK GUIDED CARRIAGE

BACKGROUND OF THE INVENTION

The art of photocomposing probably originated almost as early as the art of photography. In the late 1800's photographic output for a telegraph system was devised. Instead of hitting mechanical keys to print a message, the system used a photographic exposure of the letters to be printed. Since that time, serial printing of characters and other information by photography developed relatively slowly until the time was reached when science and engineering was ready for it. In the 1930's high intensity flash sources were developed so that all of a sudden it became possible to make a photographic exposure of a moving thing and stop its motion in flight. At roughly the same time, logic circuitry began to develop to the point where it was possible to make a rapid selection of one of a number of objects and to select such objects at a precise time and position. Accordingly, in the mid 1940's, several people, virtually simultaneously, developed photocomposing machines which operated with moving images of alphanumeric characters, selecting these characters at relatively high speed and stopping the motion with a strobe flash. In relatively quick succession, at least three different photocomposing machines of this sort came into being as evidenced by Tansel U.S. Pat. No. 2,725,803, Higonnet and Moyroud U.S. Pat. No. 2,790,362, and Perry U.S. Pat. No. 2,876,687. Machines of the sort related to these patents have been developed during the years and have found an increasing place in the market. The art of photocomposing is steadily growing as a significant new way of generating a printing master.

Most recently with improvements in computers and automation, it is becoming possible to compose type by means of photocomposition at increasing speeds and with increasing quality of result. It is now possible to compose type either from a keyboard or coded signal input, which may be derived from punched tape or magnetic tape or from a source such as a transmission wire, and to compose the type with final printing quality such that it is almost indistinguishable from letter press printing and in many instances better than letter press.

The optics associated with such machines has become so good, and the computer or other automatic control has become so rapid and effective, that once again, the more difficult problems associated with photocomposing apparatus have become mechanical and optical control problems rather than electronics problems. Selection of an image and its presentation to an optical system at a precise location and precise time have improved substantially in recent years, but there still remain the nagging problems of presenting the selected image precisely at the desired point on a photoreceptor so that the selected character is precisely and uniformly positioned right where it should be.

GENERAL NATURE OF THE INVENTION

The present invention, generally speaking, is a new and improved photo recording or display machine such as, for example, a photocomposing machine having a rapidly moving character carrier, means to flash a selected character and to project an image of said selected character to a single location, and means to move the optical output of said system along a scanning line. The optical output means is carried across the desired line on a carriage propelled by a stepping motor or similar mechanism operating through a rack and pinion wherein the gears of the rack and pinion are yieldingly forced into close engagement, for example, by spring loading means. A single guide rail operating in combination with the rack accurately positions the output carriage from one end of its path of travel to the other end, essentially independent of normal looseness of fit between guide mechanisms. The mounting and drive means is useful in many devices employing scanning.

Among the results achieved, a greater accuracy of control through simplified means, simplified adjustment and alignment in manufacturing of service operations, and substantial reduction in production costs. When assembled, the optical output has essentially zero clearance in critical direction and retains this critical closeness of fit throughout extensive periods of machine use and wear. Zero clearance in critical directions accompanies preloading in all adverse directions.

The invention is more fully illustrated in the drawings, in which:

FIG. 2 is a diagrammatic front view of a portion of working parts of the machine shown in FIG. 1.

FIG. 5 is a front view of a carriage and carriage mounting means according to another embodiment of the invention.

FIG. 6 is a partial section of upper carriage mounting means according to the embodiment of FIG. 5.

DETAILED DESCRIPTION OF THE INVENTION

Figure 1:
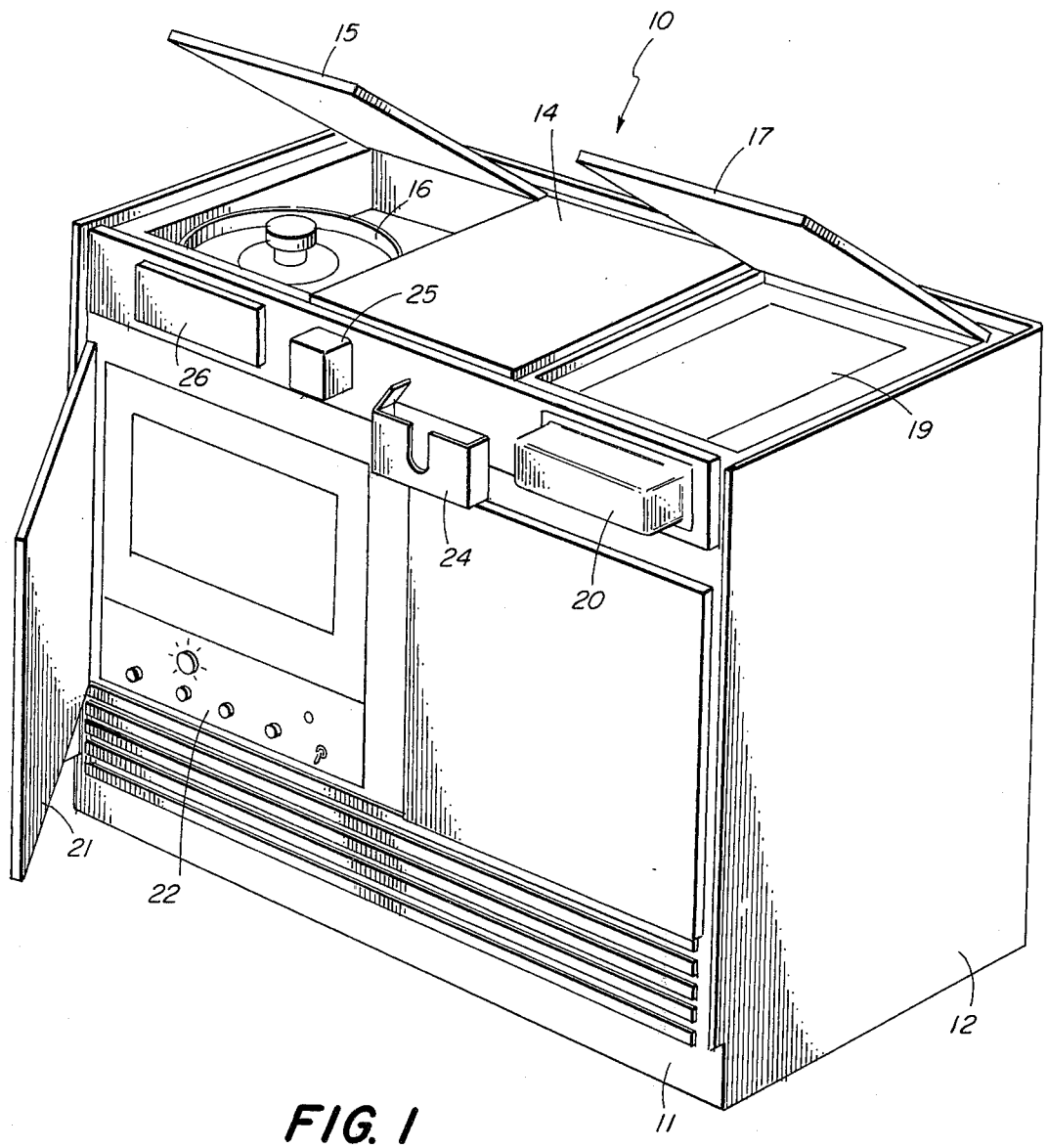
FIG. 1 is a perspective view of a photo composing machine according to one embodiment of the invention.

In FIG. 1 is a photo composing machine generally designated 10 including front, side, back and top walls. The front wall is generally designated 11, the side wall generally designated 12 and the top generally designated 14. The back wall is not shown, and in fact may be partly or completely open if desired to permit easy access to the internal portions of the machine for repair, maintenance and service. As illustrated, the top wall 10 has a hinged panel 15 providing access to a character drum 16. A second top hinged panel 17 provides access to a photo printing panel location 19 adapted to receive and support photographic film paper or other photo recording means which is adapted to be received and wound up in a take up cassette 20 positioned at the front of the cabinet.

A front panel 21, also hinged, provides access to a control panel 22 which is positioned for operator convenience at the front of the photo composing machine. Convenience accessories 24, 25 and 26 for operator convenience may, if desired, be mounted on the machine cabinet.

Figure 3:
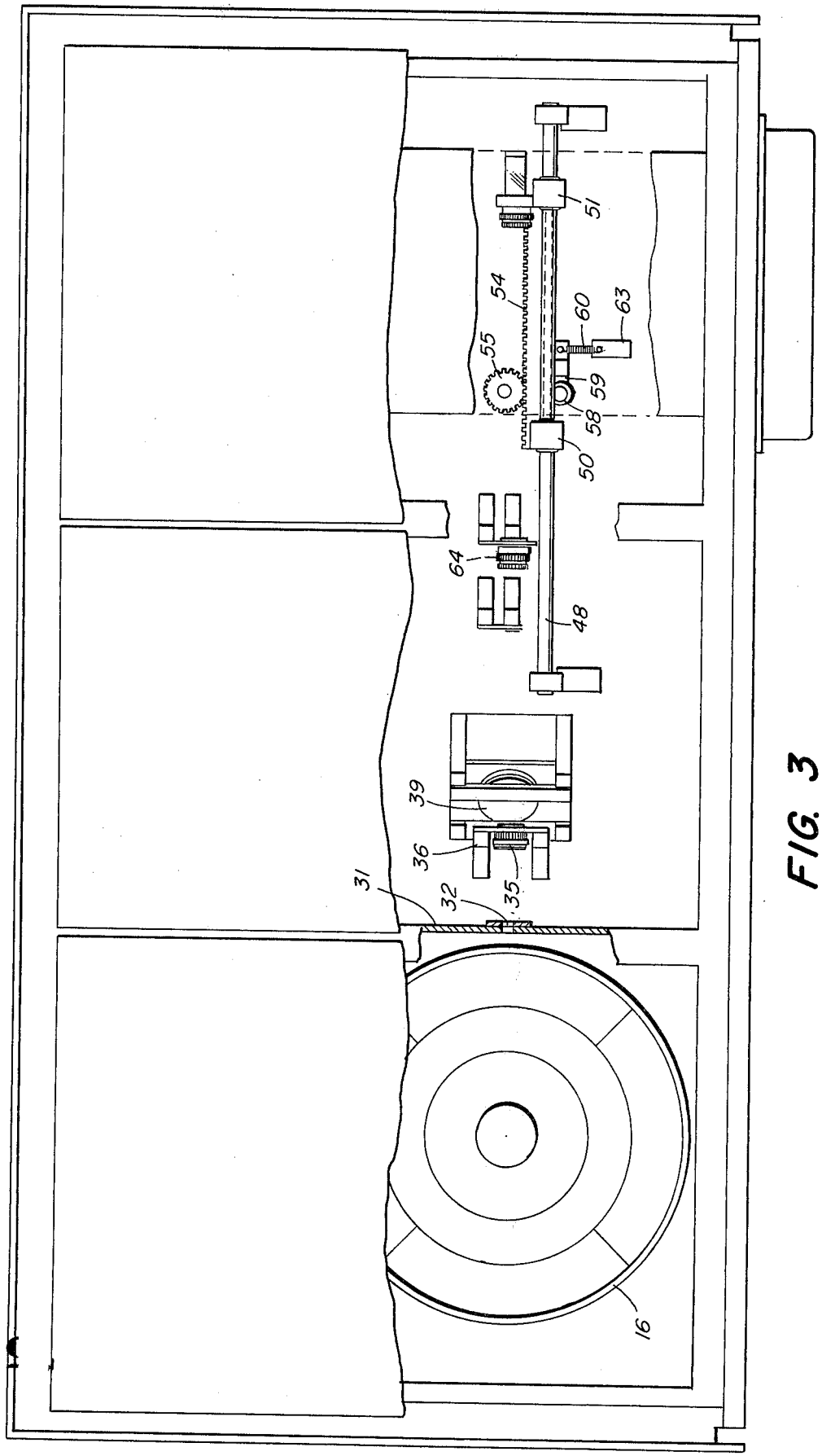
FIG. 3 is a top view of the machine shown in FIG. 1, partly in section.

In FIGS. 2 and 3 are illustrated the mechanical and optical chain of the photo composing machine according to one form of the invention. This machine, in practice, employs a single character drum 16 adapted to be rotated on a central support or axle 28 which is driven by drive motor 29. According to other embodiments of the invention, the machine, may, if desired, have a plurality of such character drums 16. Positioned near the bottom edge of the drum 16 and within the drum facing outwardly, if a flash lamp 30 adapted to provide an extremely short duration flash. Ordinarily, a xenon lamp is employed. But of course, other forms of strobe lights, or if desired, lasers, may be used. The lamp is required to have a sufficiently short duration of flash so that it stops the motion of the drum, and it must also have a sufficient intensity of flash so that when carried through the optical system and projected onto a photo receptor, it will produce sufficient photo response in the receptor. Mounted on drum 16 are four interchangeable shoes or holders, each containing a character font or, in the alternative, a poriton of a font or one or more fonts so that character fonts or styles can be changed either by interchanging such shoes or mounting means or by interchanging the entire drum. A drum of this type with interchangeable fonts is shown in U.S. Pat. No. 3,721,174.

Positioned adjacent to drum 16 is a baffle 32 having an aperture 32 positioned adjacent to a font step on drum 16 and adapted to pass light from the font strip through the aperture and onto the remainder of the optical chain.

A projection lens 35 mounted in a lens holder 36 is positioned near aperture 32 to receive a character image flashed from lamp 30 through the character font and aperture 32 and direct such image onto one of a series of mirrors 38 mounted on platform 39. A plurality of such mirrors 38 are positioned in a ring around the platform surface. According to one embodiment of the invention, six such mirrors are employed, each being positioned at a slightly different angle with respect to the surface of the platform. The platform 39 is rotatable by means of motor 40 to bring one of the selected mirrors 38 onto the optical path with the result that by correctly selecting which mirror is in position, it is possible to select one of six rows of characters on drum 16 for transmission through the remainder of the optical system. This tract selector of this type is disclosed in copending application Ser. No. 442,807 filed Feb. 15, 1974 and entitled Photocomposing Machine.

Positioned essentially directly above the selected mirror 38 is a mirror support 41 having a mirror 42 mounted thereon at essentially a 45° angle with respect to the vertical. The mirror 42 is thereby adapted to receive a protected image from mirror 38 and project it in essentially a horizontal direction through the remainder of the optical path.

Figure 4:
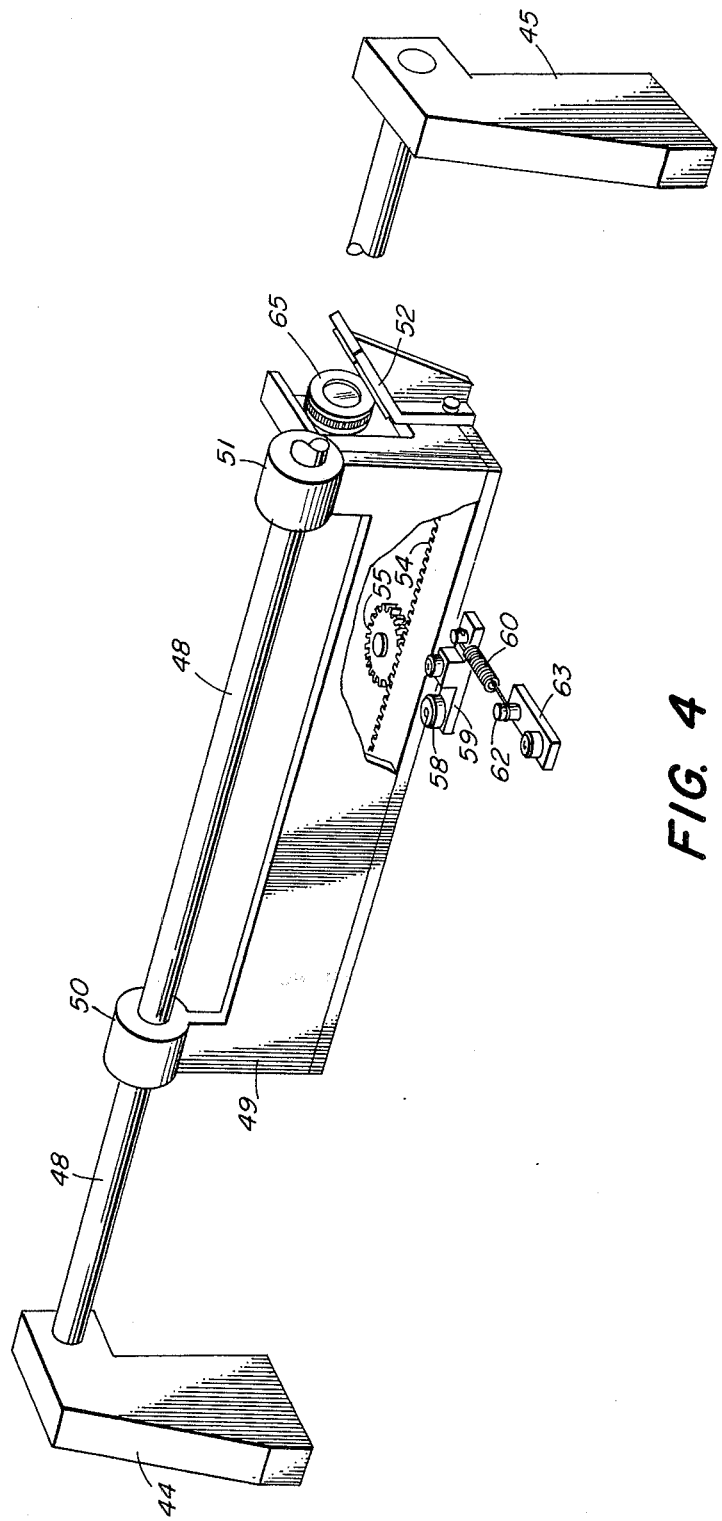
FIG. 4 is a perspective view of a carriage component according to the embodiment of the invention shown in the preceding figures.

At the output end of the optical systems is a carriage assembly shown in FIGS. 2 and 3 and also in FIG. 4. A carriage support frame has two supporting end pieces 44 and 45 mounted on the machine frame support 46, this support being a frame member or carriage bed member rigidly fastened to main frame support members (not shown). Mounted between end pieces 44 and 45 is a single carriage track or rod 48, and mounted on track 48 is the carriage frame 49 including the bearing members 50 and 51 at either end of the frame 49 to form the horizontally slidable mounting between carriage frame 49 and track 48. Both track 48 and the bearings are round and cylindrical so that the carriage frame 49 is rotatable around track 48 as its axis of rotation. A mirror or prism 52 is mounted at the far end of the carriage frame 49 and adapted to reflect from the optical systems at right angles upwardly onto a photo receptor adapted to be positioned in photo printing panel location 19 (see FIG. 1).

A wheel or bearing 58 mounted on a support block 59 is spring loaded with a spring 60 anchored to a mount 60 on the machine frame at a predetermined load such that a rack 54 mounted on the base of the frame is firmly engaged with a gear or pinion 55. Pinion 55 is driven by a stepping motor 56 (see FIG. 2) in response to a signal defining the desired motion or position of the optics output carriage.

FIGS. 5 and 6 illustrated another embodiment, presently preferred of spring loaded mounting of carriage 49 for sliding motion on carriage tract 48. On the base of carriage frame 49 is mounted a wheel of bearing 70, rotatably mounted on a pivot arm 71 on a hinge or pivot 72. A spring 73 secured between anchor 74 and a point on pivot arm 71 is positioned to pull bearing 70 downwardly from carriage frame 49. A metal strip or roller plate 75 is mounted on the machine main frame below carriage 49, and accordingly the carriage rides on roller plate 75.

It is observed that spring 60 (see FIG. 4) is so loaded as to press rack 54 against gear 55.

At the top of carriage frame 49 are two wheels or bearing 77 and 78 mounted on yoke 79 and positioned to ride along shaft or track 48. Two sets of such bearings 77 and 78 are employed, one set at each end of the frame 49. Spring 73 (see FIG. 4) is loaded with sufficient stress to bring bearings 77 and 78 firmly against track 48.

As can be seen in FIGS. 5 and 6, carriage 49 is mounted to roll smoothly along track 48, and to engage the rack and pinion 54 and 55 smoothly and firmly during such sliding motion. Regardless of bearing wear, and regardless of wear or adjustment of the rack and pinion, carriage 48 rolls easily in a line along the machine and in precise position on the line.

The photocomposing machine, as illustrated is mechanically simple, relatively maintenance free and quite inexpensive to operate. It can print from a wide variety of type faces or fonts or, in one embodiment, can contain a type font of about 3,000 different characters. The optics output carriage assembly and drive mechanism for the assembly are useful for optics output of scanning type printing and display units wherever extremely accurate, easily adjustable and long wearing output means are desired.

If desired, the output optics mounted on carriage may be a mirror and lens as shown in the figures, or it may be other optical output such as, for example, the output end of a fiber optics bundle as shown in U.S. Pat. No. 3,693,516.

We claim:

1. A photo typesetter comprising a character store having at least one font of characters movable through a display position,
   means to generate a short duration flash to illuminate stored characters from said font,
   an optical system having an input end and an output end
   means to project an image of said illuminated characters to the input end of said optical system,
   a movable carriage at the output end of said optical system and means mounted on said carriage to project said character image to a photoreceptor position, a single guide rail mounted parallel to said photo receptor position said carriage being mounted on said single rail, rotatable around said rail and slidable along said rail, drive means adapted to drive said carriage along said rail, said drive means including a drive member and a driven member, one of which is mounted in said carriage, means to force load said carriage to maintain said drive member and said driven member into engagement with each other at a predetermined force.

2. The appartus according to claim 1, wherein the drive member and driven member are a rack and pinion, the rack being mounted on said carriage.

* * * * *

UNITED STATES PATENT OFFICE
CERTIFICATE OF CORRECTION

Patent No. 3,914,774   Dated October 21, 1975

Inventor(s) Louis E. Griffith and Peter B. Ebner

It is certified that error appears in the above-identified patent and that said Letters Patent are hereby corrected as shown below:

Column 3, line 21, delete "32" and insert --31--

Column 6, line 2, delete "driven" and insert --drive--

Signed and Sealed this

Seventh Day of September 1976

[SEAL]

Attest:

RUTH C. MASON
Attesting Officer

C. MARSHALL DANN
Commissioner of Patents and Trademarks